No. 888,481. PATENTED MAY 26, 1908.
R. FRITSCH.
LIQUID METER.
APPLICATION FILED SEPT. 12, 1906.
2 SHEETS—SHEET 1.
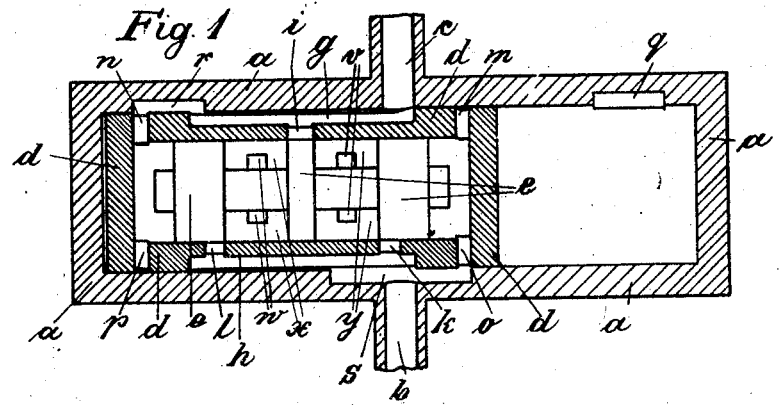
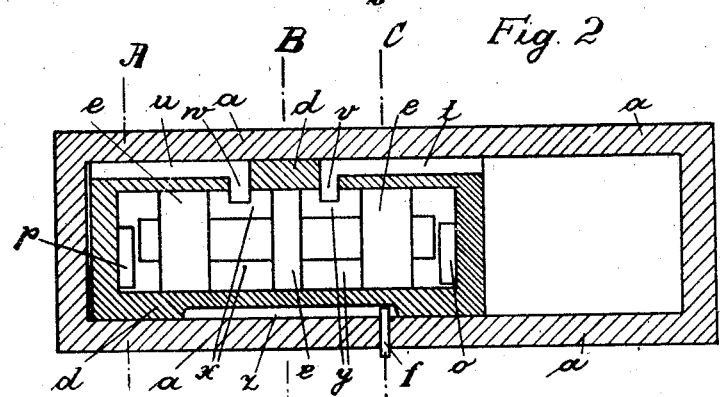
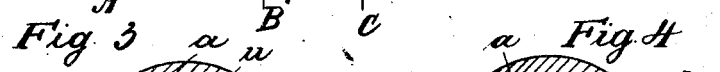
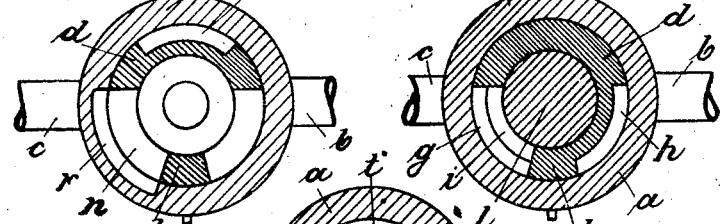
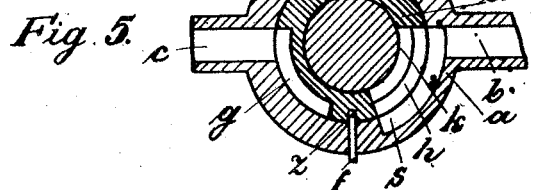
Inventor.
Rudolf Fritsch.

No. 888,481. PATENTED MAY 26, 1908.
R. FRITSCH.
LIQUID METER.
APPLICATION FILED SEPT. 12, 1906.

2 SHEETS—SHEET 2.

Witnesses
Inventor
Rudolf Fritsch.

UNITED STATES PATENT OFFICE.

RUDOLF FRITSCH, OF OBERLÖSSNITZ, NEAR DRESDEN, GERMANY.

LIQUID-METER.

No. 888,481.    Specification of Letters Patent.    Patented May 26, 1908.

Application filed September 12, 1906. Serial No. 334,299.

*To all whom it may concern:*

Be it known that I, RUDOLF FRITSCH, a subject of the German Emperor, and resident of Oberlössnitz, near Dresden, Germany, have invented new and useful Improvements in and Relating to Liquid-Meters, of which the following is a specification.

The object of the present invention is a liquid meter.

The system of the improved liquid-meter bases on the principle of the well known piston valves, as the reversing gear consists of a piston slide valve, sliding within the casing of the meter.

This liquid meter differs from the known meters in that the piston as well as the piston valve is formed by simple cylindrical pistons in order to simplify the manufacture of the same.

Figure 6:
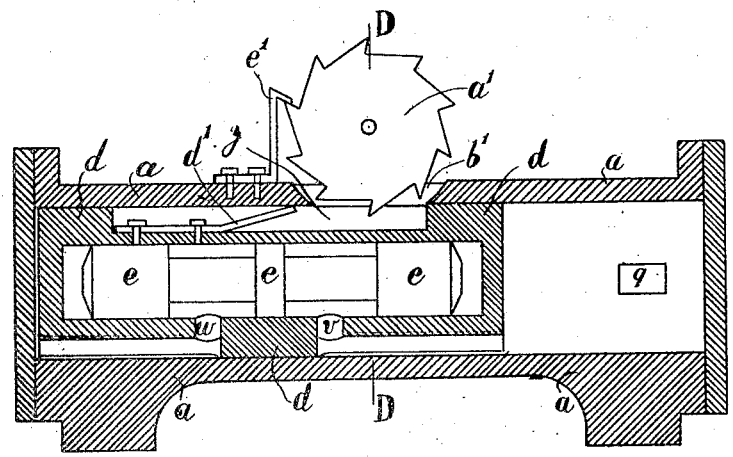
Figure 7:
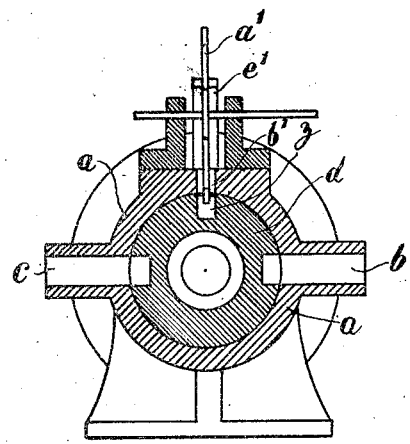

In the accompanying drawing the invention is shown in a constructional form, and Figures 1 and 2 show longitudinal sections. Fig. 3 shows a cross section on the line A—A, Fig. 2. Fig. 4 shows a cross section on the line B—B, Fig. 2. Fig. 5 shows a cross section on the line C—C, Fig. 2. Fig. 6 shows a longitudinal section of the meter with a device for transmitting the movements of the piston to a dial, and Fig. 7 is a cross section on the line D—D, Fig. 6.

The liquid meter consists of a cylindrical casing $a$, provided with pipes $b$ and $c$ for the entrance and escape of the liquid to be measured. These pipes are suitably arranged opposite to each other and placed in the same plane of the grooves $q$, $r$, $s$ provided inside said casing $a$. Inserted into the cylindrical casing $a$ is a hollow piston $d$, which is secured against rotation by means of a pin $f$.

Corresponding with the middle axis of the pipes $b$ and $c$ piston $d$ is provided with grooves $g$, $h$ and apertures $i$, $k$, $l$, $m$, $n$, $o$, $p$. Leading from the axis of the piston are the apertures $v$, $w$, and the grooves $u$, $t$, the latter leading to the ends of said piston $d$. Inserted in the interior of the piston $d$, is the piston valve $e$ provided on its circumference with grooves $x$, $y$.

In the position of the piston $d$ and of the piston valve $e$ as shown in the annexed drawing, the liquid to be measured enters by $b$ flows through the groove $s$ and the aperture $o$ into the interior of the piston $d$, and pushes the piston valve $e$ to the left hand side, while the liquid contained in the space between the piston valve $e$ and the piston $d$ at the left hand side, escapes through the apertures $n$ and the grooves $r$ and $g$ through the pipe $c$. By this movement of the piston valve $e$, the apertures $l$ and $i$ become opened. Now the liquid entering by $b$ flows through the groove $h$ and the aperture $l$, the groove $x$, the aperture $w$ and the groove $u$ behind the piston $d$ and pushes the same to the right hand side, while the liquid contained in the space in the front of said piston $d$, i. e. in the space between the wall of the cylindrical casing $a$, and the piston $d$ on the right hand side, is emptied through the groove $t$, the aperture $v$, the groove $y$, the aperture $i$ and the groove $g$ to the pipe $c$. The movement of the piston $d$ is continued till it arrives on the other end of the casing $a$, and the liquid flows through the groove $s$ and the aperture $p$ behind the piston valve $e$, whereby the latter is pushed to the right hand side and the liquid contained in the space in the front of the piston valve $e$ is forced to the pipe $c$ through the aperture $m$, the grooves $q$ and $g$. By this movement of the piston valve $e$, the apertures $l$ and $i$ become closed, and the apertures $k$ and $i$ become opened whereafter the liquid is forced through the groove $h$, the aperture $k$, the groove $y$, the aperture $v$ and the groove $t$ behind the piston $d$ and pushes said piston to the left hand side, while the water contained in the space in the front of the piston $d$ is forced through the groove $u$ and the aperture $w$, the groove $x$, the aperture $i$ and the groove $g$ to the pipe $c$. The motion of the piston is continued till it has occupied the position again as shown in the drawing, in which position the liquid enters again behind the piston valve $e$, through the groove $s$ and the aperture $o$ and pushes said piston valve to the left hand side, whereafter the operation as aforesaid is repeated.

The strokes of the piston $d$ are transmitted by a spring $d^1$ fixed to the piston to a ratchet wheel $a^1$ which is inserted through a slot $d^1$ in the casing $a$. This ratchet wheel $b^1$ which transmits in any suitable manner its movements to a dial or the like, is prevented from being moved backwards by a spring $e'$ fixed to the casing $a$. The ratchet wheel is moved through one tooth at every forward stroke of the piston $d$.

Having fully described my invention, what I claim and desire to secure by Letters Patent is:—

A liquid meter, comprising in combination, a cylindrical casing ($a$) provided in its interior with grooves ($q$, $r$, $s$) a piston ($d$) provided with grooves ($g$, $h$, $u$, $t$) and apertures ($i$, $k$, $l$, $m$, $n$, $o$, $p$, $v$, $w$) the said piston ($d$) situated inside the casing ($a$) and prevented from turning by a pin ($f$) a piston valve ($e$) provided on its circumference with grooves ($x$, $y$) the said piston valve situated inside the piston, the cylindrical casing being provided with a slot $b^1$, a ratchet wheel $a^1$ projecting through the slot, a spring $d^1$ fixed to the piston, said spring adapted to transmit the motion of the piston to the ratchet wheel, a spring $e^1$ fixed to the casing, said spring adapted to prevent the ratchet wheel being moved backwards, substantially as described and shown and for the purpose set forth.

In testimony whereof I have hereunto set my hand in the presence of two subscribing witnesses.

RUDOLF FRITSCH.

Witnesses:
HENRY O. REANSY,
D. MADDISON.